United States Patent [15] 3,675,310
Schwaneke et al. [45] July 11, 1972

[54] SOLDERING METHOD

[72] Inventors: Alfred E. Schwaneke, Rolla; Wilbert L. Falke, St. James; Orrin K. Crosser, Rolla, all of Mo.

[73] Assignee: The United States of America as represented by the Secretary of the Interior

[22] Filed: April 20, 1971

[21] Appl. No.: 135,768

[52] U.S. Cl. .................................................. 29/492, 29/504
[51] Int. Cl. .......................................................... B23k 31/02
[58] Field of Search .............................. 29/196.5, 492, 504

[56] References Cited

UNITED STATES PATENTS

| 2,001,186 | 5/1935 | Dornier | 29/492 UX |
| 3,299,503 | 1/1967 | Freyberger et al. | 29/492 X |
| 3,355,265 | 11/1967 | Hudson et al. | 29/196.5 X |
| 3,364,064 | 1/1968 | Wijburg | 29/492 X |
| 3,412,455 | 11/1968 | Bronnes et al. | 29/492 X |
| 3,469,301 | 9/1969 | Freyberger et al. | 29/492 X |

FOREIGN PATENTS OR APPLICATIONS

| 309,032 | 10/1929 | Great Britain | 29/504 |
| 547,755 | 9/1942 | Great Britain | 29/504 |

*Primary Examiner*—John F. Campbell
*Assistant Examiner*—Ronald J. Shore
*Attorney*—Ernest S. Cohen and William S. Brown

[57] ABSTRACT

Metallic members consisting essentially of copper or copper alloy, low carbon steel, stainless steel, nickel or nickel alloy, or any combination thereof, are joined together by initially coating the members to be joined with a thin layer of nickel, followed by application of solder consisting essentially of zinc or zinc alloy and appropriate fluxes containing metallic salts, at a temperature of about 320° to 500° C. The metallic members may also be joined by addition of nickel or nickel salts to the flux material so that the required thin nickel coating is obtained by a reaction during soldering such that the coating is deposited on the surface of the metallic members from the flux.

The thin layer of nickel, obtained as above, constitutes a "sacrificial metal coating" that is absorbed into the molten solder during soldering. The method of the invention is particularly useful in manufacture and repair of automobile radiators and utensils or appliances for home cooking.

15 Claims, No Drawings

SOLDERING METHOD

For many years attempts have been made to close the "-solder gap" between tin-lead soft solders, having maximum practical operating temperatures below 140° C, and the lowest practical brazing or hard soldering temperatures of about 538° C. Between these limiting temperatures no practical solders or soldering systems exist for use with copper or copper alloys.

It has now been found, according to the method of the invention, that copper or copper alloy, low carbon steel, stainless steel, or nickel or nickel alloy members may be readily and securely joined by initially coating them with a thin layer of nickel, followed by application of zinc, or zinc alloy, solder with appropriate fluxes containing metallic salts at a temperature of about 0° to 60° C above the melting point of the solder, i.e., from about 320° to 500° C.

Alternatively, the metallic members may be joined, without the initial coating of a thin layer of nickel, by addition of nickel or nickel salts to the flux, whereby during the soldering operation a thermochemical reaction deposits the required thin layer of nickel on the members to be joined.

The members to be joined may be sheet, rod, tubing, pipe, bar, plate, castings, or other forms, made from standard commercial grades, or better, of copper or copper alloys, including brasses, bronzes, or aluminum bronzes; low carbon steel; stainless steel; or nickel or nickel alloys. Application of the method of the invention to brasses, i.e., alloys whose main constituents are copper and zinc, requires that the zinc in the surface areas to be contacted by the solder be removed by etching with solutions of hydrocloric acid or sulfuric acid. To obtain a solder joint of proper strength the zinc in the alloy surface should be etched out and removed from a layer of about 0.004 cm thickness in the areas to be joined before coating with the thin layer of nickel. Where the procedure includes the application of the thin nickel layer before soldering, the removal of the surface layer of zinc is accomplished with acids of a strength conventionally used for cleaning of metal surfaces to be electroplated with nickel.

As with conventional soldering or brazing systems, the members to be joined by the method of the invention may be of the same alloy or metal or any combination of the operable metals or alloys, e.g., brass may be joined to copper, steel, stainless steel, bronze or other brasses of similar or different composition, etc., or all may be joined together into one composite joint.

A primary requirement of the method of the invention is that the nickel coating be thin, i.e., about $10^{-4}$ to $10^{-6}$ cm. This thickness permits penetration of the coating by the solder to provide a metal-metal bond between the zinc, or zinc alloy, solder and the metal substrate or member, with the thin nickel layer being absorbed into the solder. The nickel layer thus serves as a "sacrificial" coating whose essential function is to promote wetting of the metal substrate by the solder. A thickness of about $10^{-6}$ cm may be used where the subsequent soldering operation is conducted in an open atmosphere with the necessary flux, while a greater thickness, e.g., about $10^{-4}$ cm, is usually preferable when the soldering is done in an enclosure containing inert gases and a flux is not used.

The nickel coating may be applied by any conventional means capable of providing the correct thickness and of providing a coating that is substantially free of impurities or foreign materials. Electroplating from standard nickel electroplating solutions has been found to give good results. Coatings applied by sputtering in a vacuum system are also effective.

Zinc or a zinc alloy is employed as solder in the invention. The alloys are generally preferred since pure zinc becomes brittle at low temperatures and exhibits excessive creep at temperatures not far above room temperature. Zinc die casting alloys are stronger and more ductile at low temperatures than pure zinc. A preferred group of alloys are the zinc-aluminum alloys containing aluminum in amounts of about 4 to 30 percent. Particularly preferred are those containing about 20 to 25 percent aluminum since they are superplastic at elevated temperature (about 275° C) and do not have a ductile-brittle transition at low temperatures. Other suitable alloys are zinc-cadmium alloys containing about 2 to 40 percent cadmium, zinc-tin alloys containing about 0.6 to 35 percent tin and zinc-lead alloys containing about 8 to 20 percent lead. The zinc-base alloys may also contain a third or fourth element in addition to the binary compositions given above. Typical ternary formulations would contain zinc-89 percent, aluminum-7 percent, copper-4 percent and zinc-75 percent, aluminum-20 percent, copper-5 percent. The optimum zinc-base alloy for the solder is dependent upon the melting properties and the strength properties desired for the joint.

The zinc or zinc alloy solder is applied to the members to be joined by techniques conventional in the soldering art. For example, the members to be joined are placed in contact with, or in close proximity to, each other, preferably to provide a gap of no more than about 0.05 cm between them when heated. A fluxing material, if employed, either in dry form or as a paste made with water or another liquid as a vehicle, is applied to the area in which the joint is to be made. The solder, in any convenient form, such as a pellet or rod, is placed in contact with one or both members in the vicinity of the junction or gap between the members. The solder may be applied before heating the members or during the period when the members are being heated. In any case, heat is then applied to the assembly, preferably at a point opposite where the solder is, or is to be, applied and in such a manner as to heat both members rapidly to soldering temperatures of about 320° to 500° C, depending upon the melting properties of the particular solder alloy used. Heat is applied by conventional means such as propane-air hand torch or other types of torches, or the members may be heated electrically or by contact with a heated soldering iron. Suitable amounts of solder will obviously depend on the size and configuration of the members to be joined, type of solder and flux, temperature, etc., and is readily determined by one skilled in the art. When the assembly reaches the required temperature, and the flux and solder melt, the solder flows smoothly and rapidly, by means of capillary action, around and between the members. Usually, only a few seconds are required to form a smooth joint.

If the soldering is performed in a vacuum-tight enclosure filled with inert or deoxidizing gases, and the solder used does not contain aluminum or magnesium alloyed with the zinc, the soldering operation may be conducted without the presence of a chemical flux. However, if the soldering operation is performed in the open atmosphere, or with soldering alloys containing aluminum or magnesium, a flux is required.

The purpose of the flux is to: (1) cover the members to be soldered and the molten solder during the soldering operation to prevent oxidation of the members and solder at the high temperature used, and (2) provide a thermochemical ebullience to break up or remove oxide coatings that form around molten zinc alloy solders or on the members being soldered. Suitable fluxes for use where the members are first coated, by electroplating or vacuum sputtering, with a thin layer of nickel are mixtures of metal salts containing KCl, NaF, LiCl, $ZnCl_2$, LiF, $NH_4Cl$ or NaCl in the following ranges: 0 to 48 percent KCl, 0 to 10 percent NaF, 2 to 42 percent LiCl, 11.5 to 88 percent $ZnCl_2$, 0 8 percent LiF, and 5 to 24 percent $NH_4Cl$. Examples of suitable fluxes are: 33 percent KCl, 5.3 percent NaF, 17 percent LiCl, 39.4 percent $ZnCl_2$, and 5.3 $NH_4Cl$; 88 percent $ZnCl_2$, 10 percent $NH_4Cl$, and 2 percent LiCl.

Suitable fluxes for the process where the members to be joined are not initially coated with a layer of nickel, but where the nickel layer is laid down on the members by the flux during the soldering operation contain, along with the above listed chemical compounds, added nickel or nickel salts such as 0.6 to 1.5 percent $NiCl_2$, or 0.6 to 2 percent $NiF_2$, etc. A typical flux for soldering with zinc-aluminum alloy solders on uncoated copper members is 32.55 percent KCl, 5.25 percent NaF, 16.8 percent LiCl, 38.85 percent $ZnCl_2$ 5.25 percent $NH_4Cl$, and 1.3 percent $NiCl_2$. One to 4 percent metallic nickel in powder form added to the above-listed fluxes has also been found successful in laying down the necessary nickel coating during soldering.

Fluxes are applied in conventional manner as aqueous pastes or dry powders by placing the required amount on the surface of the members to be joined in the area to be wetted by the solder. Suitable amounts of flux will, of course, also depend upon the above mentioned variables, and can be readily determined by one skilled in the art.

When using the above procedures, spontaneous wetting, spreading, and capillary penetration of the solder are extremely rapid and produce high tensile strength joints as easily as conventional tin-lead solders on appropriate metals at lower temperatures.

The invention will be more specifically illustrated by the following example:

EXAMPLE

In this example a butt joint was made between a ⅜-inch diameter solid copper cylinder and a ⅛-inch thick, 1 ½-inch square copper plate. Both members were of commercial copper known as "electrolytic tough pitch." The end of the cylinder and the surface of the plate were coated with a $10^{-5}$ cm thick layer of nickel by electroplating from a standard electroplating bath consisting of $NiSO_4$, 44 ounces per gallon of solution, $NiCl_2$, 6 ounces per gallon, boric acid, 5 ounces per gallon, plus water. The bath was used at a temperature of about 60° to 65° C. and the plating accomplished with a direct current supply of a few milliamperes for the required time to form the necessary thickness of coating. Before plating the members degreased in acetone, etched slightly in dilute $HNO_3$ and washed with water. The cylinder was placed on the plate, a small quantity of paste flux was brushed around the juncture of the plate and cylinder, and a pellet of zinc-aluminum-copper alloy, 3/16-inch diameter, 0.1-inch thick was placed in the flux at the juncture of the plate and cylinder. The assembly was heated with a small propane-oxygen torch with the flame directed to strike the juncture of the plate and cylinder at a point opposite the location of the zinc alloy pellet.

When the pellet melted the molten solder immediately flowed around and under the cylinder. The instant the molten solder flowed around the cylinder the heating was stopped and the assembly allowed to cool. The total time required was less than 1 minute. Only a few seconds were required for the molten solder to form a smooth joint showing a tensile strength of over 32,000 psi.

We claim:

1. A soldering method for joining metallic members consisting essentially of copper or copper alloys, low carbon steel, stainless steel, or nickel or nickel alloys to each other in any combination, comprising coating the members to be joined with a layer of nickel having a thickness of about $10^{-4}$ to $10^{-6}$ cm and subsequently applying between the juxtaposed members a solder consisting of zinc or a zinc alloy at a temperature of about 320° to 500° C, whereby the molten solder penetrates the thin nickel coating and forms a metal-metal bond between solder and said members to join said members.

2. The method of claim 1 in which the copper alloy to be soldered is a brass.

3. The method of claim 2 in which the zinc is removed from a thin surface section of the brass member by etching before the nickel layer is applied.

4. The method in claim 1 in which the nickel layer is applied by electroplating.

5. A method of claim 1 in which the nickel layer is applied by sputtering in a vacuum enclosure.

6. The method of claim 1 in which the solder is zinc.

7. The method of claim 1 in which the solder is a zinc-aluminum alloy containing about 4 to 30 percent aluminum.

8. The method of claim 7 in which the alloy contains about 20 percent aluminum.

9. The method of claim 1 in which the solder is a zinc-aluminum-copper alloy containing about 7 to 20 percent aluminum and 1 to 5 percent copper.

10. The method of claim 1 in which a flux is also employed in the soldering process.

11. The method of claim 10 in which the flux consists of a mixture of metal chlorides and metal fluorides.

12. The method of claim 10 in which the layer of nickel is obtained from a flux containing nickel or nickel salts.

13. The method of claim 12 in which the flux contains about 1 to 4 percent powdered nickel metal.

14. The method of claim 12 in which the flux contains about 0.6 to 1.5 percent nickel chloride.

15. The method of claim 1 in which the soldering operation is performed in an inert or reducing atmosphere without employing a flux.

* * * * *